US012723631B2

(12) United States Patent
Shahin

(10) Patent No.: US 12,723,631 B2

(45) Date of Patent: Sep. 1, 2026

(54) BRAKE SYSTEM

(71) Applicant: HL MANDO CORPORATION, Pyeongtaek (KR)

(72) Inventor: Hatem Shahin, Pfaffenhofen (DE)

(73) Assignee: HL MANDO CORPORATION, Pyeongtaek (KR)

( * ) Notice: Subject to any disclaimer, the term of this patent is extended or adjusted under 35 U.S.C. 154(b) by 469 days.

(21) Appl. No.: 18/340,062

(22) Filed: Jun. 23, 2023

(65) Prior Publication Data

US 2023/0417300 A1 Dec. 28, 2023

(30) Foreign Application Priority Data

Jun. 27, 2022 (DE) ......................... 102022206468.2

(51) Int. Cl.

| | |
|---|---|
| ***F16D 65/10*** | (2006.01) |
| ***B60T 1/06*** | (2006.01) |
| ***F16D 53/00*** | (2006.01) |
| ***F16D 65/00*** | (2006.01) |
| *F16D 65/02* | (2006.01) |

(52) U.S. Cl.

CPC ................ *F16D 65/10* (2013.01); *B60T 1/06* (2013.01); *F16D 53/00* (2013.01); *F16D 65/0031* (2013.01); *F16D 2065/1336* (2013.01)

(58) Field of Classification Search

CPC ................. F16D 65/10; F16D 65/0031; F16D 2065/1336; F16D 53/00; B60T 1/06

USPC ........................................................ 188/18 A

See application file for complete search history.

(56) References Cited

U.S. PATENT DOCUMENTS

| | | | | |
|---|---|---|---|---|
| 1,857,888 | A * | 5/1932 | Stout | B60B 21/08 244/110 A |
| 2,988,173 | A * | 6/1961 | Romine | F16D 65/0031 188/78 |
| 7,475,950 | B1 * | 1/2009 | Glenn | B60B 3/085 301/64.203 |
| 8,333,437 | B2 * | 12/2012 | Matsuda | C09J 107/02 157/1.1 |
| 2023/0417300 | A1 * | 12/2023 | Shahin | F16D 65/0031 |

FOREIGN PATENT DOCUMENTS

| | | | | |
|---|---|---|---|---|
| DE | 2607098 | A1 | 8/1977 | |
| DE | 102018205863 | A1 | 10/2019 | |
| DE | 102020216507 | A1 * | 6/2022 | B60B 21/12 |
| FR | 3101385 | A1 * | 4/2021 | F16D 65/0031 |
| JP | H08226468 | A | 9/1996 | |

OTHER PUBLICATIONS

DE102020216507-A1 (Year: 2022).*
FR3101385-A1 (Year: 2021).*
DE Office Action Dated May 11, 2023.

* cited by examiner

*Primary Examiner* — Thomas J Williams

(74) *Attorney, Agent, or Firm* — Harvest IP Law, LLP

(57) ABSTRACT

A brake system for a vehicle comprises a wheel and a tire mounted on the wheel. The wheel has a chamber that is at least partially arranged within a volume defined by the tire, a friction surface being provided at a wall delimiting the chamber. A brake shoe is arranged within the chamber, configured to be pressed against the friction surface for braking.

15 Claims, 28 Drawing Sheets

BRAKE SYSTEM

CROSS-REFERENCE TO RELATED APPLICATION

This application is based on and claims priority under 35 U.S.C. § 119 to German Patent Application No. 102022206468.2, filed on Jun. 27, 2022 in the German Patent and Trade Mark Office, the disclosures of which are incorporated herein by reference.

TECHNICAL FIELD

The present invention is in the field of vehicle technology. It relates to a brake system for a vehicle.

BACKGROUND

Brake systems for vehicles typically feature a rotating body, such as a brake drum or a brake disk, and a friction material that is configured to be pressed against this rotating body. As a result of friction between these components, dust and noise are generated. In known brake systems, certain problems occur due to the fact that the brake components are largely exposed and in contact with their environment and ambient air. Noises, especially squeal noises occur, which are very unpleasant, brake dust is generated and enters the environment, which may be critical to people's health, and finally, corrosion of the brake components is enhanced and can lead to braking performance problems.

SUMMARY

In view of the above, it is an object of the invention to solve at least some of the mentioned problems occurring in known brake systems.

This is achieved by a brake system according to claim 1. Advantageous embodiments can be found in the dependent claims and in the following description and the figures.

Accordingly, a brake system for a vehicle comprises a wheel and a tire mounted on the wheel. The wheel has a chamber that is at least partially arranged within a volume defined by the tire, a friction surface being provided at a wall delimiting the chamber. A brake shoe is arranged within the chamber, configured to be pressed against the friction surface for braking.

In a brake system of this type, the brake shoe is thus arranged in an enclosed space, isolating the areas in which friction is produced, and thus preventing noises and dust from getting into the environment. Moreover, the brake system is protected from humidity or other outer conditions, which may affect the brake components.

The friction surface is typically provided at a wall surface of an interior wall of the chamber.

The brake shoe is typically arranged within the volume defined by the tire. I.e., the chamber and the brake shoe arranged therein are enclosed by the tire on three sides—on the axially inner side, the axially outer side, and the radially outer side. An axially inner side thereby typically remains accessible for providing an actuation system.

It is also noteworthy that by having the brake shoe in the chamber that is at least partially arranged within the volume of the tire, a larger effective radius may be achieved compared to conventional brake systems, where friction is produced at a more central location.

In the brake system, a single brake shoe may be provided for each wheel, or more than one brake shoes may be provided for each wheel, such as two brake shoes, three brake shoes, four brake shoes, or more.

For example, the chamber may comprise an opening extending around an entire circumference of the wheel, for passing an actuator system through the opening. This opening may for instance open radially inward, from the chamber. Optionally, a sliding seal may be provided for at least partially closing the opening.

The friction surface may for instance be provided at a radially inner wall portion or a radially outer wall portion or an axially inner wall portion or an axially outer wall portion of the wall of the chamber.

In an embodiment, a further friction surface may be provided at a further wall portion of the wall delimiting the chamber. For example, the further friction surface may be opposite to the friction surface, e.g. it may be provided at an outer wall portion of the wall of chamber, that is opposite to the inner wall portion at which the friction surface is provided.

For example, the friction surface may be formed by a wall surface of the wall delimiting the chamber. In some embodiments, it is envisioned that there is no additional layer, but the brake shoe is pressed directly against the wall surface. However, the friction surface may also formed by a material layer which is attached to the wall delimiting the chamber. For example, the material layer may be made of metal, such as cast iron, or of a friction material, such as a semi-metallic friction material, or a low-metallic friction material, or an organic friction material, or a ceramic friction material, as they are commonly used for brake pads.

The wheel may one or more cavities that are at least partially arranged within the volume defined by the tire. For example, the one or more cavities may be located adjacent to a section of the wall at which the friction surface is provided, opposite of the friction surface (i.e. behind the wall, as seen from the brake shoe and the friction surface). The one or more cavities may for instance be provided radially outward and/or radially inward from the chamber. The chambers may facilitate cooling and/or they may be designed for providing support for the tire.

In an embodiment, a stiffening element may be provided on the wheel, the stiffening element for example connecting a hub with a radially inner wall portion of the chamber, and/or the stiffening element connecting a spoke of the wheel, with the radially inner wall portion of the chamber. The stiffening element may provide additional strength and resistance to take into account the forces acting in the radially outer area, where the brake shoe is pressed against the friction surface For example, the wall delimiting the chamber (whose surface may optionally form the friction surface) may be made of cast iron. Additionally or alternatively, spokes of the wheel may be made of cast iron or aluminium. For example, spokes and the rim portion at which the friction surfaces and chambers are provided, may be made of the same material, wherein a hub portion of the wheel may for instance also be made of that material. Alternatively, the rim portion, which has the chambers and friction surfaces, may be made of a different material than the spokes and/or hub portion.

In an embodiment, the wall delimiting the chamber may comprise cooling holes. For example, the cooling holes may be provided in a region of the friction surface. Typically, the are through-holes.

In an embodiment, a dust collector may be provided for collecting brake dust. The dust collector may be arranged within the chamber. Additionally or alternatively, the dust collector may be arranged in a region of the spokes of the wheel. The dust collector may for example comprise a magnetic material for adhesion of metallic brake dust.

In an embodiment, the brake system may comprise a main bearing for bearing a wheel hub on an axle (which may be formed as a typical bearing known from the prior art), and an auxiliary bearing for bearing a rim portion of the wheel on a knuckle or on a carrier for connection with the knuckle.

In the brake system according to the present invention, the tire may be configured according to a modified tire design. For example, the tire may be connected to the wheel by an adhesive. Therein, the adhesive may for example be provided between an inner surface of the tire, and the wheel. For example, the adhesive may be provided between an inner surface of the tire and an outer surface of the wall delimiting the chamber. Additionally or alternatively, the tire may comprise a tire cavity. The tire cavity may be filled with air, for providing a desired tire pressure. The tire cavity may be provided between an inner rubber portion, optionally configured to be attached to the wheel by an adhesive, and an outer rubber portion, configured to run on a street surface, for example.

For example, the brake system may be a hydraulic brake system or an electro-mechanic brake system or a pneumatic brake system.

The brake system may be a brake system for a truck. In an example, the brake system is a pneumatic brake system for a truck. Large truck tires may advantageously provide an abundance of space for placing the brake shoes therein.

The brake system may be provided at a front axle and/or a rear axle of a vehicle.

BRIEF DESCRIPTION OF DRAWINGS

The invention will now be explained in an exemplary fashion with reference to the appended figures.

In the Figures.

DETAILED DESCRIPTION

Figure 1:
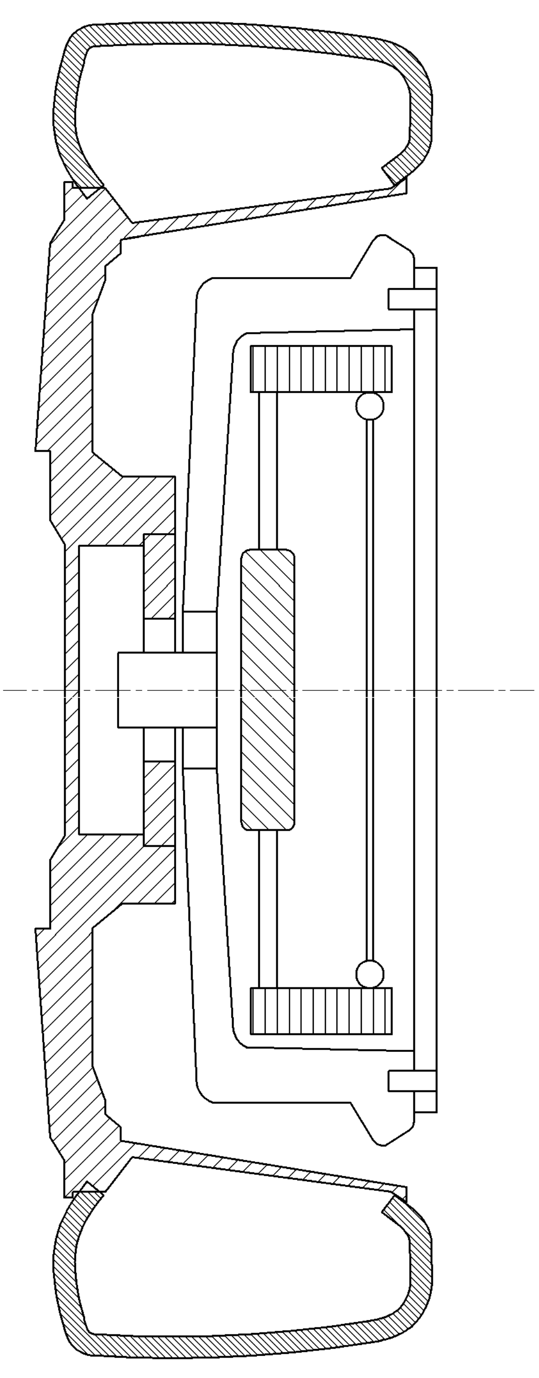
FIG. 1 shows a brake system according to the state of the art.

FIG. 1 shows a cut of a drum brake system according to the prior art, for comparison. A brake drum is attached to a wheel, and an actuator mechanism with brake shoes is arranged within the brake drum. A brake system of this type does not provide additional measures for shielding the environment from noise of brake dust.

Figure 2:
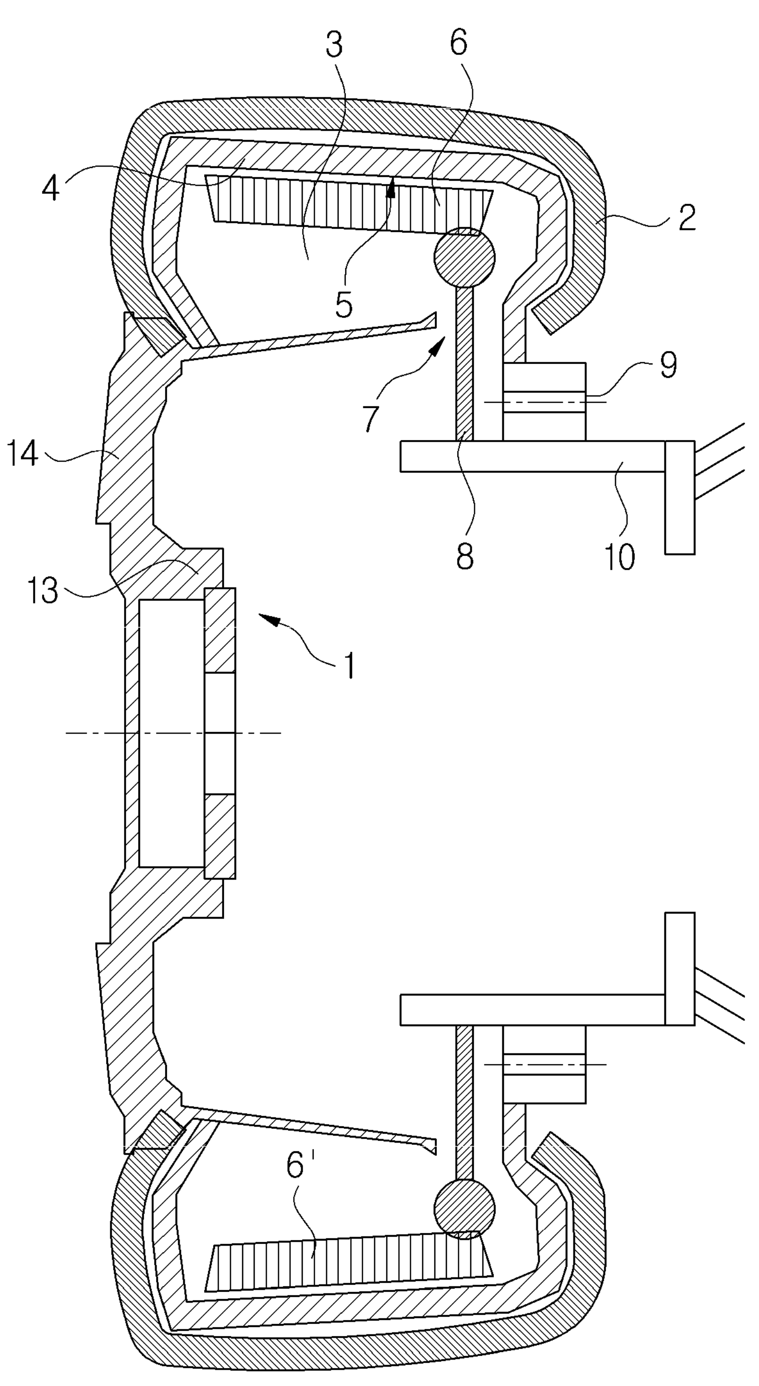
FIG. 2 shows a brake system according to the application, wherein a brake shoe is arranged within a volume defined by a tire.

FIG. 2 shoes a cut of a brake system for a vehicle, according to the present application. The brake system of this type may be provided at a front axle and/or a rear axle of a vehicle. In possible embodiments, the brake system is configured as a brake system for a truck.

The brake system comprises a wheel 1 and a tire 2 mounted on the wheel 1. The wheel 1 has a chamber 3 that is at least partially arranged within a volume defined by the tire 2. A friction surface 5 is provided at a wall 4 delimiting the chamber. A brake shoe 6 is arranged within the chamber 3, and within the volume defined by the tire 2, the brake shoe 6 being configured to be pressed against the friction surface 5 for braking. The brake shoe 6 is arranged at the top, and a further brake shoe 6' is arranged at the bottom, circumferentially opposite to the brake shoe 6, to be pressed against that same friction surface 5.

As will be explained further here below, the tire and rim are modified, compared to known brake systems. Details regarding a possible embodiment of the tire are for instance given in FIG. 28. At a rim portion of the wheel 1, the chamber 3 is formed. The tire 2 is held at an outer side of the chamber 3. At a radially inner side of the rim portion, an opening 7 is provided in the wall 4 of the chamber 3, which opening 7 extends around an entire circumference of the wheel, for passing an actuator system 8 through the opening 7, while allowing the wheel 1 to rotate. The opening 7 thereby forms an opening in a radially inner wall portion of the chamber 3. Therein, the actuator system 8 may be hydraulic, or electro-mechanic, or pneumatic.

The rim portion, which has the chamber 3, is connected to spokes 14 and through the spokes 14 to a hub 13 of the wheel 1, wherein, in FIG. 2, this connection may be seen on the left hand side. At the right hand side, the hub portion is connected to a carrier 10 and borne thereon by way of an auxiliary bearing 9.

Figure 3:
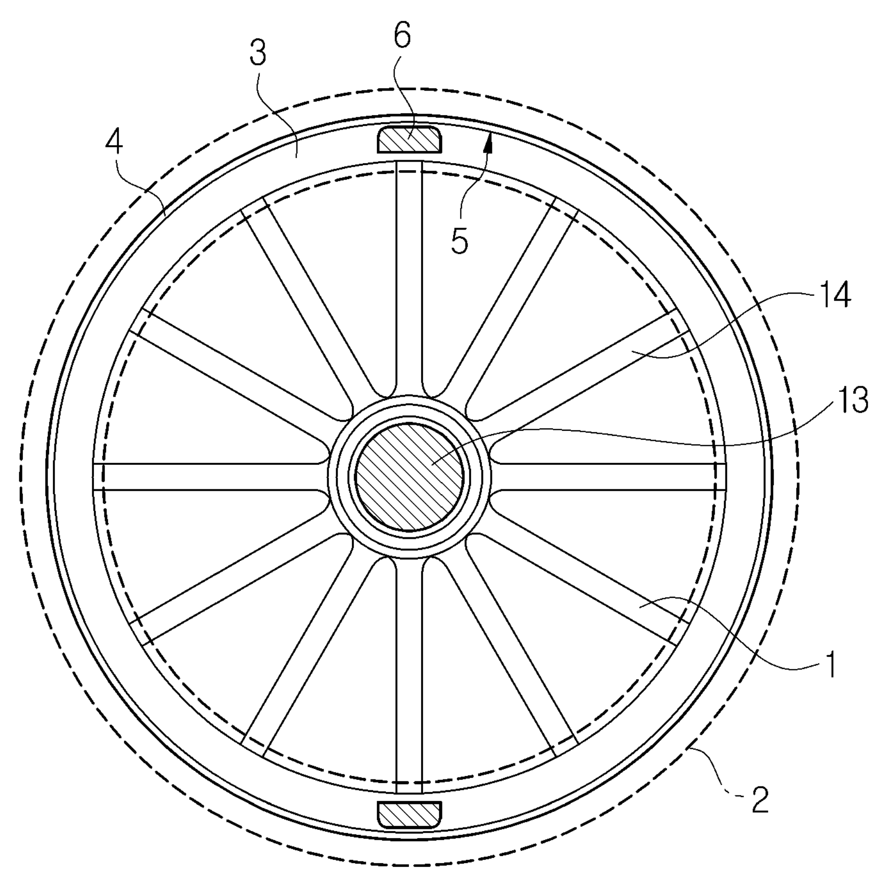
FIG. 3 illustrates a position of the brake shoe with respect to a wheel and tire, in a brake system according to the application.

FIG. 3 shows a schematic side view onto a cut-open brake system according to the present application, wherein the wheel 1, including the hub 13, the spokes 14, and the rim portion forming the chamber 3 are indicated. Moreover, the position of the tire 2 is indicated by dashed lines. The brake shoe 6 is located within the cavity and configured to be moved outward, against the friction surface 5, which is formed at the radially outer wall portion of the wall 4 of the chamber 3. The actuator system is omitted for better visibility. As can be seen from FIG. 3, the chamber 3 and the brake shoe 6 are arranged within the volume of the tire 2. By way of this, the brake shoe and the friction surface 5 are shielded laterally and at the radially outer side by the tire 2, which provides sound isolation.

Figure 4:
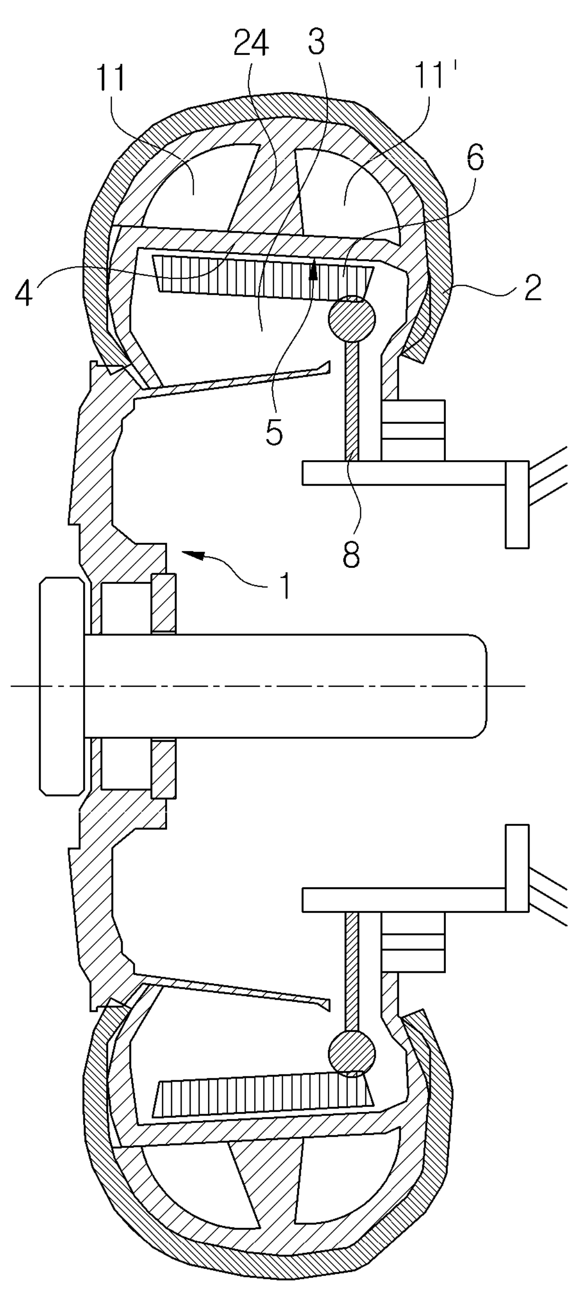
FIGS. 4-6 show embodiments of the brake system according to the application.

FIG. 4 shows a brake system according to the application, with a chamber 3 that is enclosed by the tire. The friction surface 5 for the brake shoe 6 is provided at the radially outer wall portion of the wall 4 of the chamber 3. Behind this radially outer wall portion of the chamber 3, two tangentially extending cavities 11, 11' are provided, which are also arranged within the volume defined by the tire 2. The two chambers 11 are thus located adjacent to the wall portion at which the friction surface 5 is provided, opposite of the friction surface 5, creating a void between the friction surface 5 and the tire 2, to avoid overheating of the system. A web 24 provided between the two chambers 11, 11' provides stability for the wheel 1 and the tire 2 mounted thereon. The tire 2 thereby has a rounded cross-sectional profile, which corresponds essentially to a circular arc.

Figure 5:
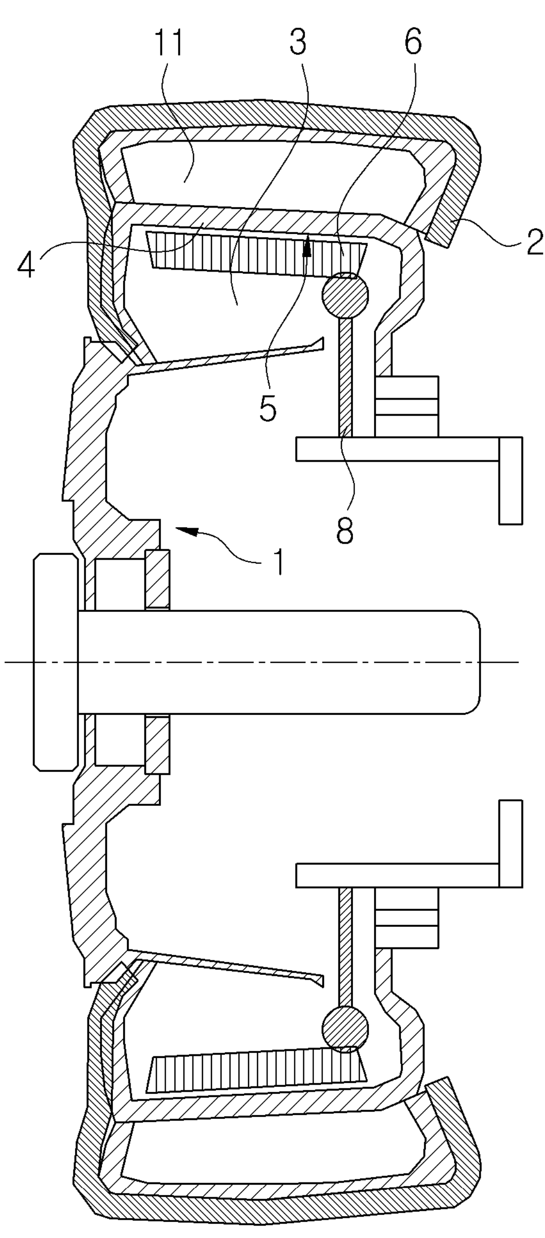

FIG. 5 shows a system that differs from FIG. 4 in that there is a single chamber 11 provided adjacent to the wall 4, opposite to the friction surface. Compared to the embodiment of FIG. 4, there is no web 24 for providing additional stability. Therefore, a different cross-sectional profile is chosen for the tire 2, namely with a flattened tread.

Figure 6:
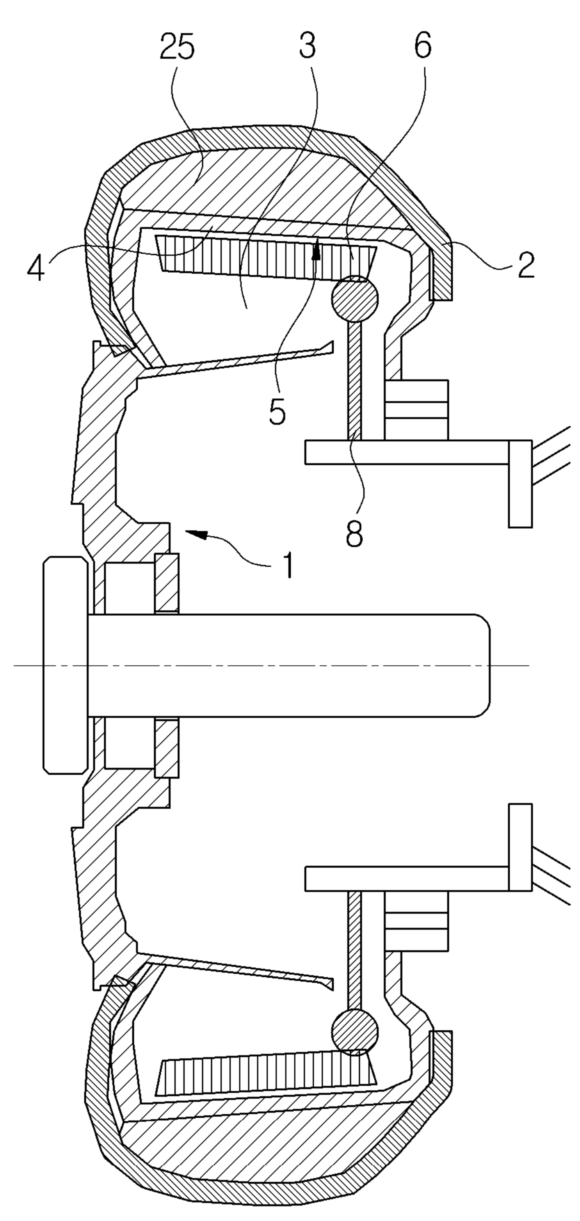

FIG. 6 shows an embodiment wherein a filling material 25 is provided adjacent to the wall 4, opposite to the friction surface 5. This filling material 25 provides stability for the tire 2 that is attached thereto. The filling material 25 is for instance chosen as a thermally insulating material, which prevents heat being transferred from the friction surface 5 to the tire 2 and vice versa.

FIGS. 7-10 show different embodiments of the brake system, wherein stiffening elements 12 are provided on that wheel 1 for additional stability of the wheel 1. Details of the chamber 3, the tire 2, and the actuator system 8 are omitted for better visibility. They may be carried out as shown in FIGS. 2-10, and 6-11.

Figure 7:
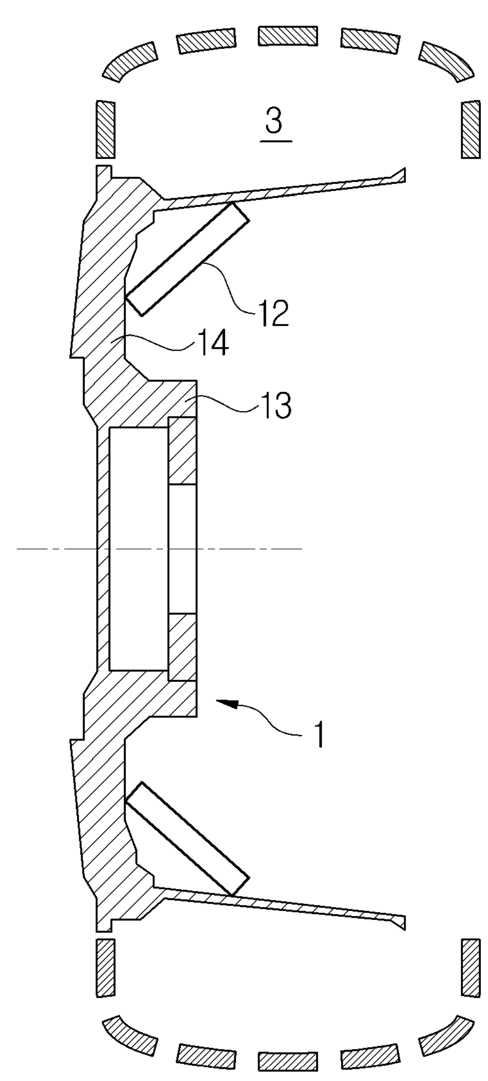
FIGS. 7-10 show brake systems with additional stiffening elements.
Figure 8:
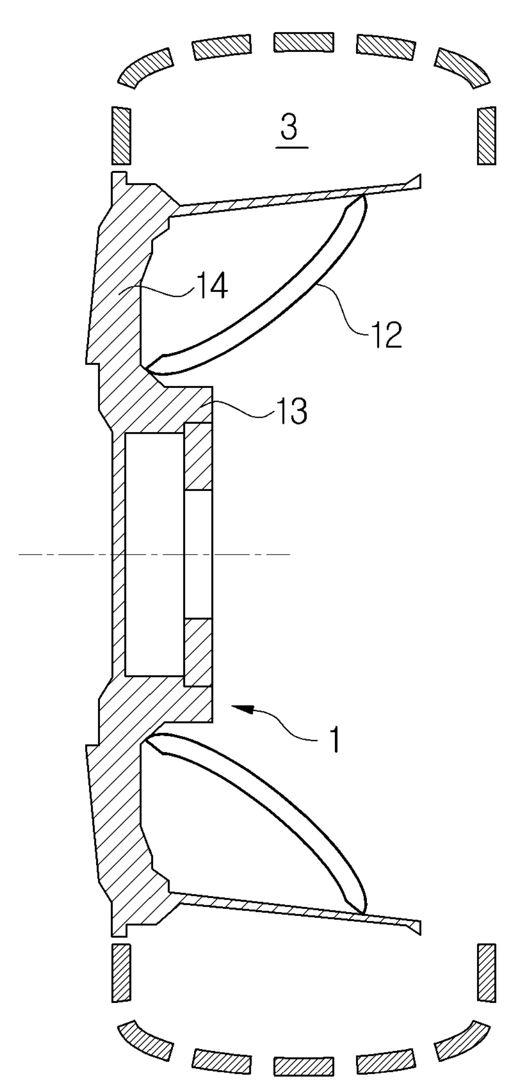

According to FIG. 7, a stiffening element 12 connects the spoke 14 and the rim portion at which the chamber 3 is formed. Specifically, the stiffening element connects the spoke 14 of the wheel, with an outer side (as seen from the chamber 3) of a radially inner wall portion of the chamber 3. When pressure is applied, in a radially inward direction or a radially outward direction, by way of the brake shoe 6 that is located in the chamber 3, the stiffening element 12 prevents undesired deformation and wear of the wheel 1. The stiffening element is carried out as a straight elongated part, which is connected to the spoke 14 and the rim portion. In some embodiments, the stiffening element 12 may be formed integrally with the spoke 14 and/or the rim portion having the chamber 3. Depending on the design of the wheel 1 and in particular the design of the spoke(s) 14, a multitude of stiffening elements 12 may be provided, or a circumferentially extending continuous stiffening element 12, for example.

In the embodiment of FIG. 7 shows an embodiment similar to the one of FIG. 7. Here, the stiffening element 12 is an elongated part with a curved shape. It is connected to the outside of the radially inner wall portion of the wall 4 of the chamber 3, and to the spoke 14, in the vicinity of the hub 13.

Figure 9:
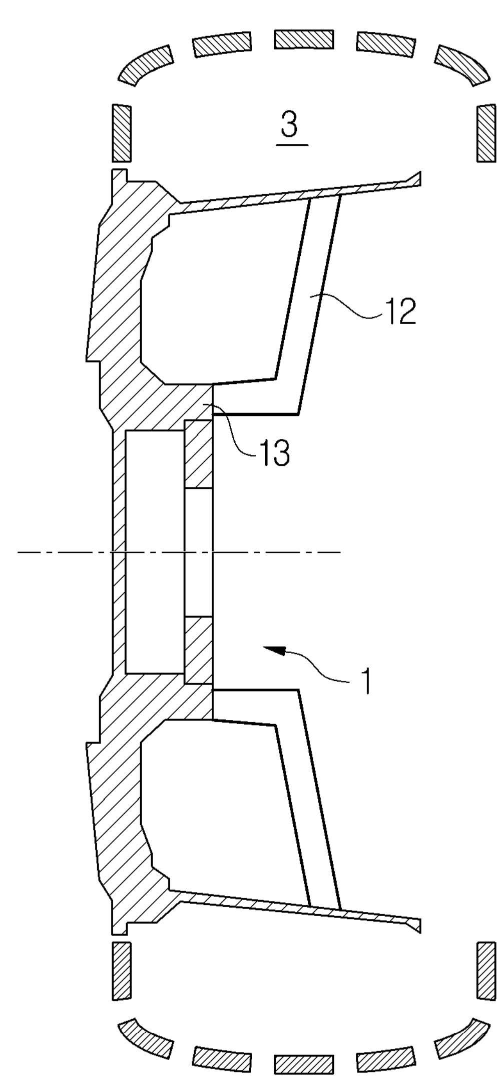

FIG. 9 shows an embodiment, where the stiffening element 12 is connected to the outside of the radially inner wall portion of the wall 4 of the chamber 3, and to the hub 13. In this example, the stiffening element 12 is connected to an axially inner side of the hub 13.

Figure 10:
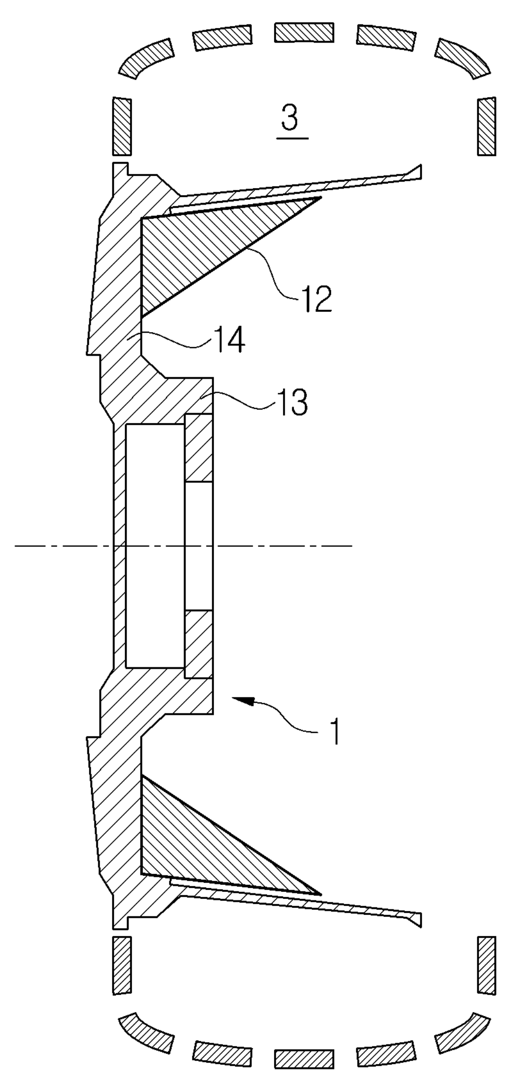

FIG. 10 shows an embodiment where the stiffening element 12 has a triangular cross-section and is arranged in the corner between the rim region (again, the outside of the radially inner wall portion of the wall 4 of the chamber 3) and the spoke 14, and is connected to both in a planar manner along its sides, to achieve an increased connection area.

Figure 11:
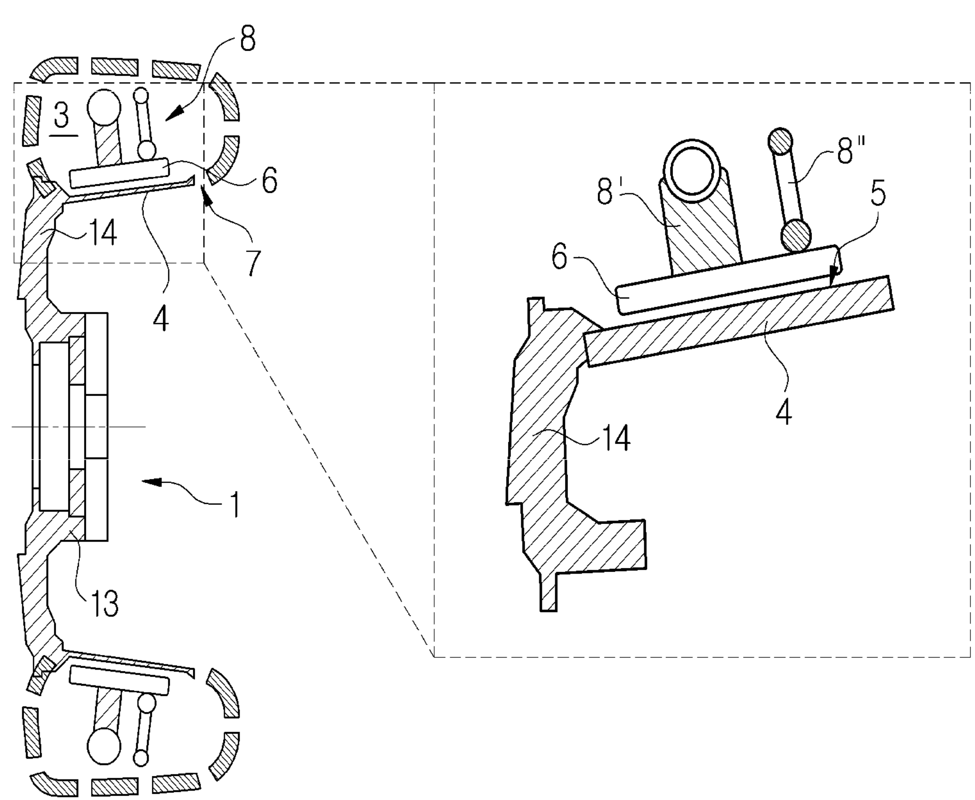
FIGS. 11-19 show further embodiments of the brake system according to the application, with different designs of friction surfaces.

FIG. 11 shows, on the left hand side, a cut view of the brake system with a chamber 3 and actuator system 8 that are provided within the volume defined by the tire 2. A position of the chamber 3 is outlined by dashed lines. Again, details of the tire 2 and of the actuator system 8, such as its passage through the opening 7, are omitted. An enlarged view of an actuator 8' and a retraction spring 8" of the actuator system 8, as well as the wall of the chamber 4 at which the friction surface 5 is provided, and a portion of the spoke 14, are shown in an inset on the right hand side.

The friction surface 5 is provided at the inside (as seen from the chamber 3) of the radially inner portion of the wall 4 of the chamber 3, such that the brake pad 6 moves radially inward for braking. In this sense, this is a radially inward-braking brake system. The friction surface 5 is thereby formed by a wall surface of the wall 4 itself. The wall 4, at least in the region of the friction surface 5, is made of cast iron, i.e., it is a cast iron ring. The spoke 14 is also formed of cast iron. The wheel including the spoke 14 and the rim portion, at which the wall 4 having the friction surface 5 is provided are thus made of the same material. They may be formed integrally.

Figure 12:
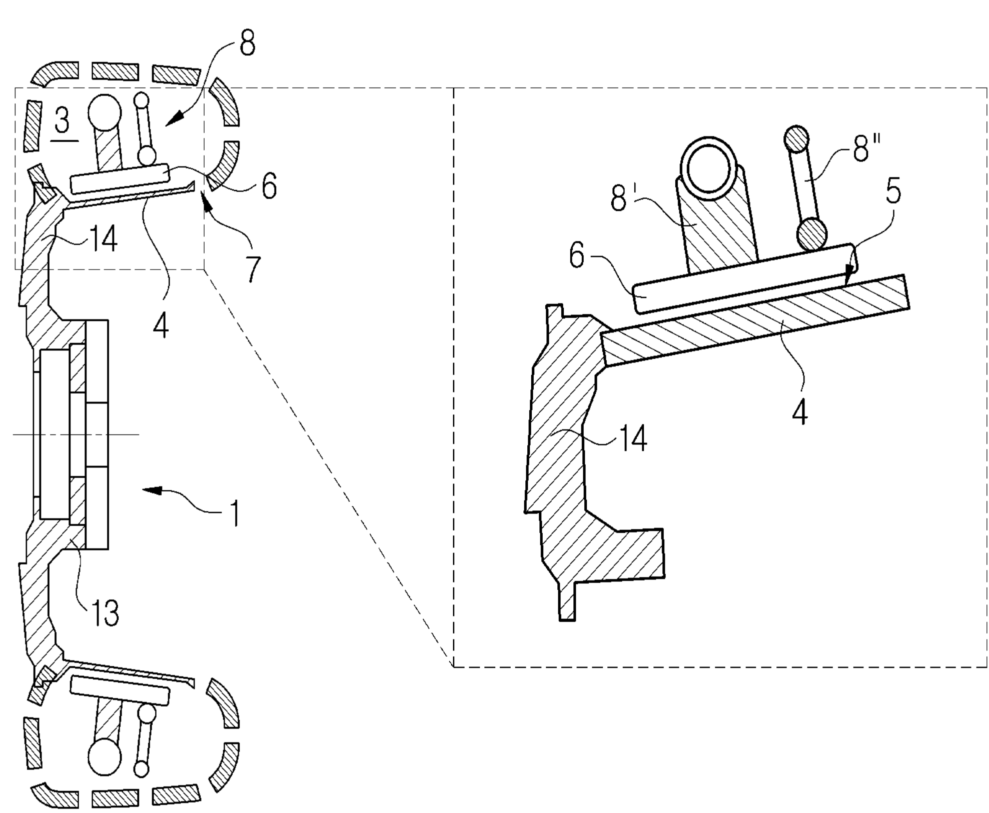

FIG. 12 shows a further embodiment of the brake system, in the same views as in the case of FIG. 11. It differs from the embodiment of FIG. 11 in that the spoke 14 is made of aluminium, while the rim portion having the friction surface 5 is made of cast iron. The wheel 1 is thus a hybrid design having aluminium spokes and a cast iron rim with a cast iron friction ring.

Figure 13:
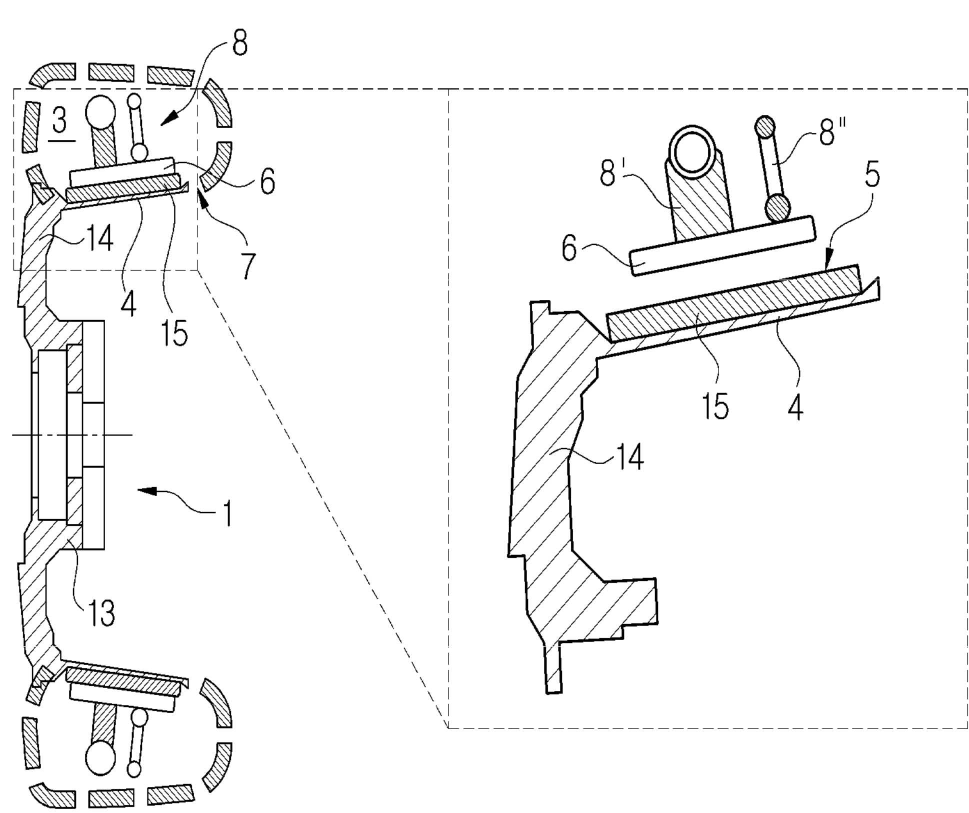

FIG. 13 shows a further embodiment of the brake system, in the same views as in the case of FIGS. 11, b. It differs from the embodiments of FIG. 11 or 12 in that the friction surface 5 is not provided by a wall surface of the wall 4 of the chamber 3 itself, but by an additional material layer 15 that is provided on the wall 4 and attached thereto. The additional material layer 15 is made of metal, such as cast iron.

Figure 14:
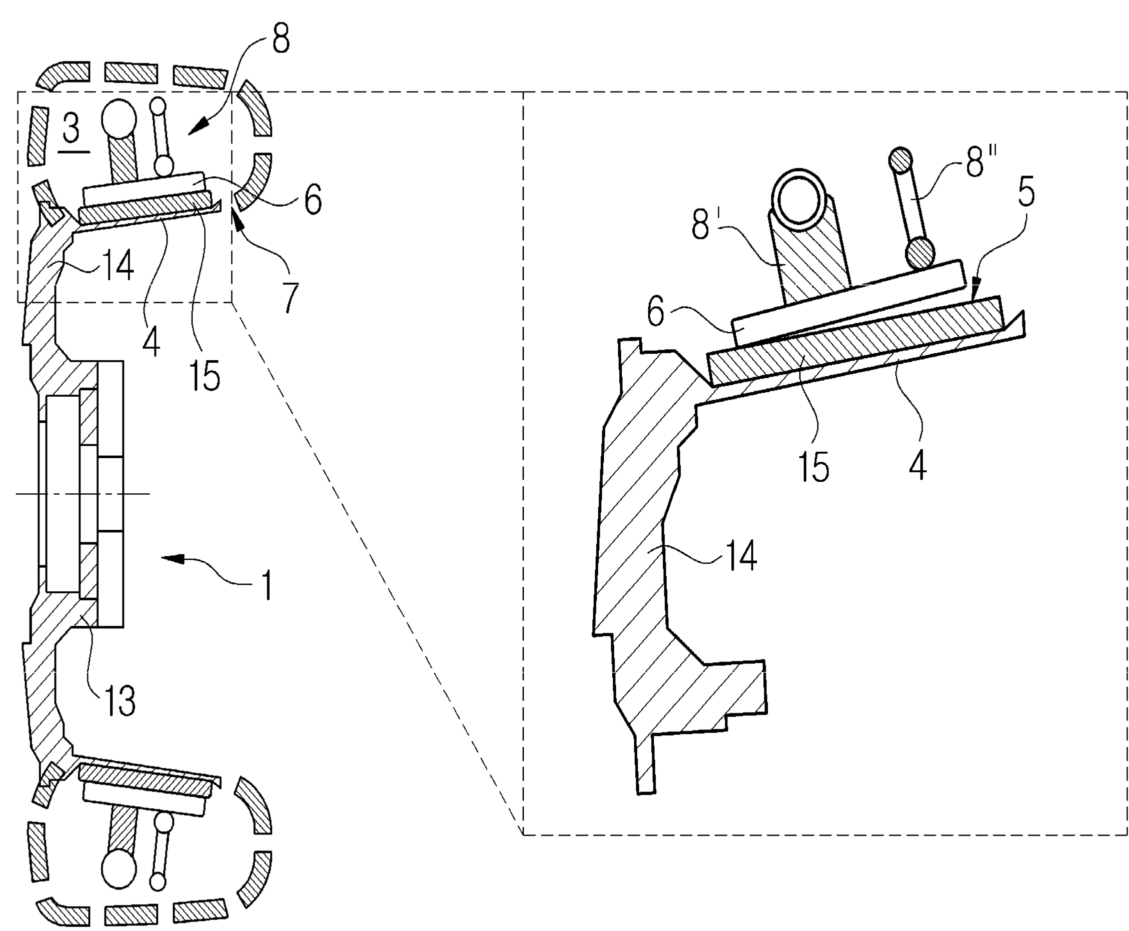

FIG. 14 shows a further embodiment of the brake system, in the same views as in the case of FIGS. 11-13. It differs from the embodiment of FIG. 13 in that the additional material layer 15 is made of a friction material, like the friction materials used in brake pads, such as a semi-metallic friction material, or a low-metallic friction material, or an organic friction material, or a ceramic friction material.

Figure 15:
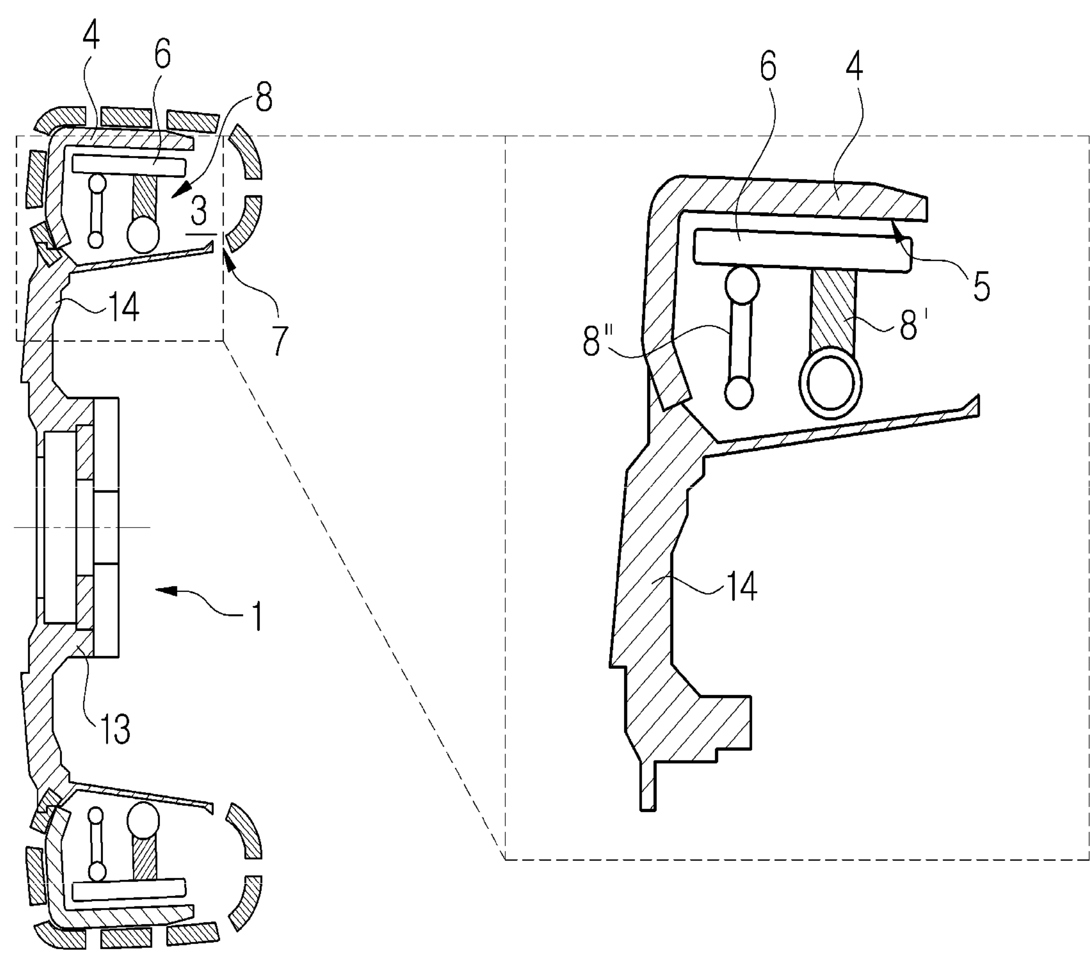

FIG. 15 shows a further embodiment of the brake system, in the same views as in the case of FIGS. 11-14. It differs from the embodiments of FIGS. 11-14 in that the wall 4 at which the friction surface 5 is provided is a radially outer portion of the wall of the chamber 3. Since the friction surface 5 is at the radially outer portion of the wall 4 of the chamber 3, the brake pad 6 moves radially outward for braking. In this sense, this is a radially outward-braking brake system. Radially outward-braking brake systems of this type advantageously have an increased effective radius.

The friction surface 5 is thereby formed by a wall surface of the wall 4 itself. The wall 4, at least in the region of the friction surface 5, is made of cast iron, i.e., it comprises a cast iron ring which forms a friction ring. The spoke 14 is also made of cast iron. The wheel including the spoke 14 and the rim portion, at which the wall 4 having the friction surface 5 is provided are thus made of the same material. They may be formed integrally.

Figure 16:
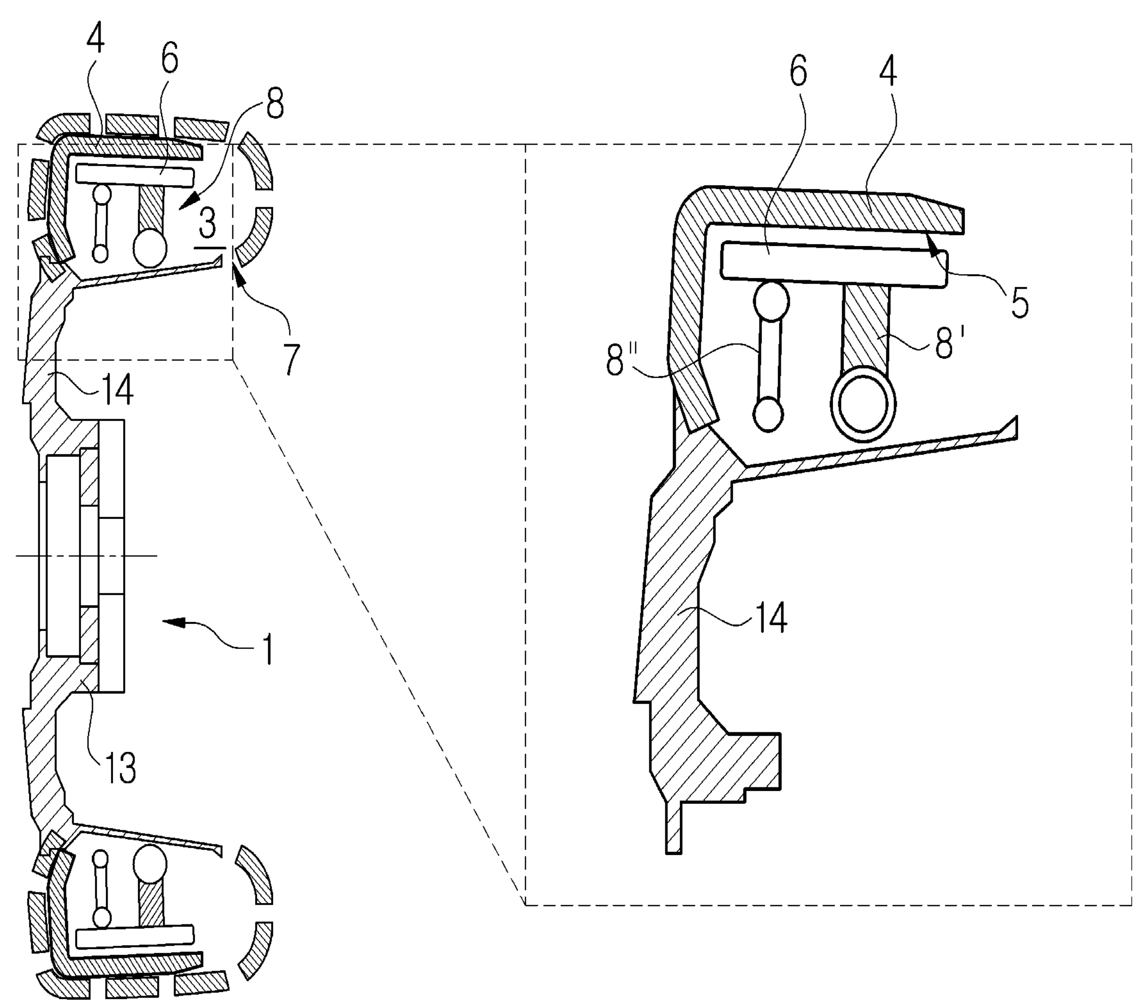

FIG. 16 shows a further embodiment of the brake system, in the same views as in the case of FIGS. 11-15. It is also a radially outward-braking brake system, as in the case of FIG. 15. It differs from the embodiment of FIG. 15 in that the spoke 14 is made of aluminium, while the rim portion having the friction surface 5 is made of cast iron. The wheel 1 is thus a hybrid design having aluminium spokes and a cast iron rim portion with a cast iron friction ring.

Figure 17:
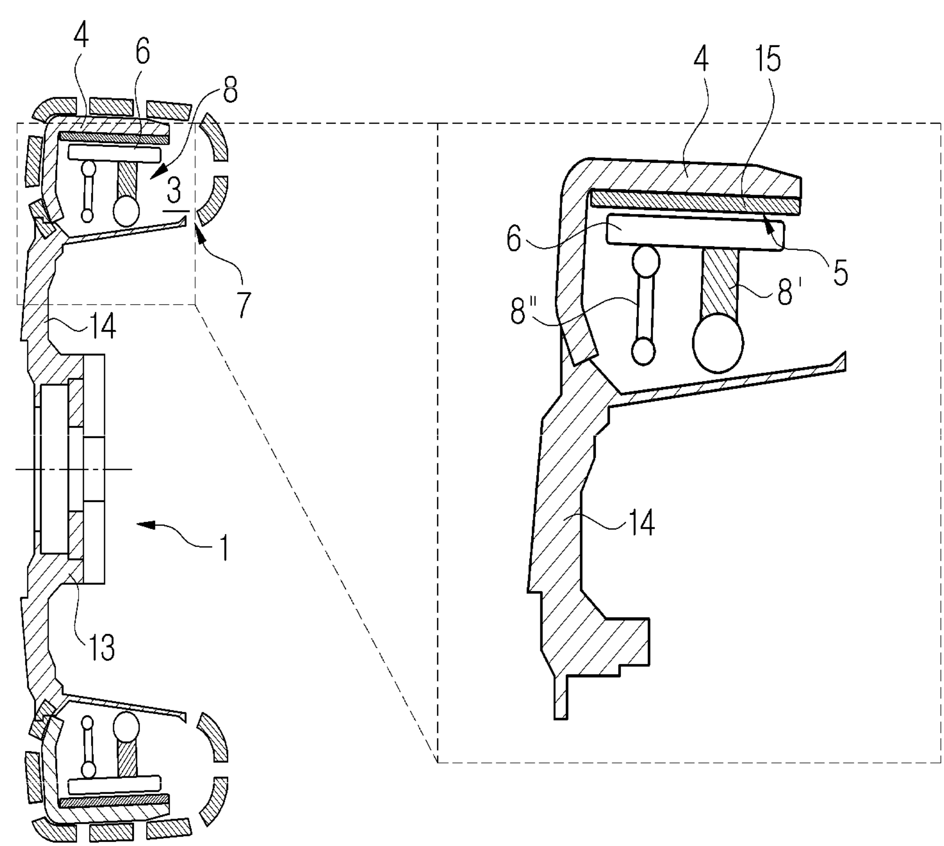

FIG. 17 shows a further embodiment of the brake system, in the same views as in the case of FIGS. 11-16. It is also a radially outward-braking brake system, as in the case of FIGS. 15-16. It differs from the embodiments of FIG. 15 or 16 in that the friction surface 5 is not provided by a wall surface of the wall 4 of the chamber 3 itself, but by an additional material layer 15 that is provided on the wall 4 and attached thereto. The additional material layer 15 is made of metal, such as cast iron.

Figure 18:
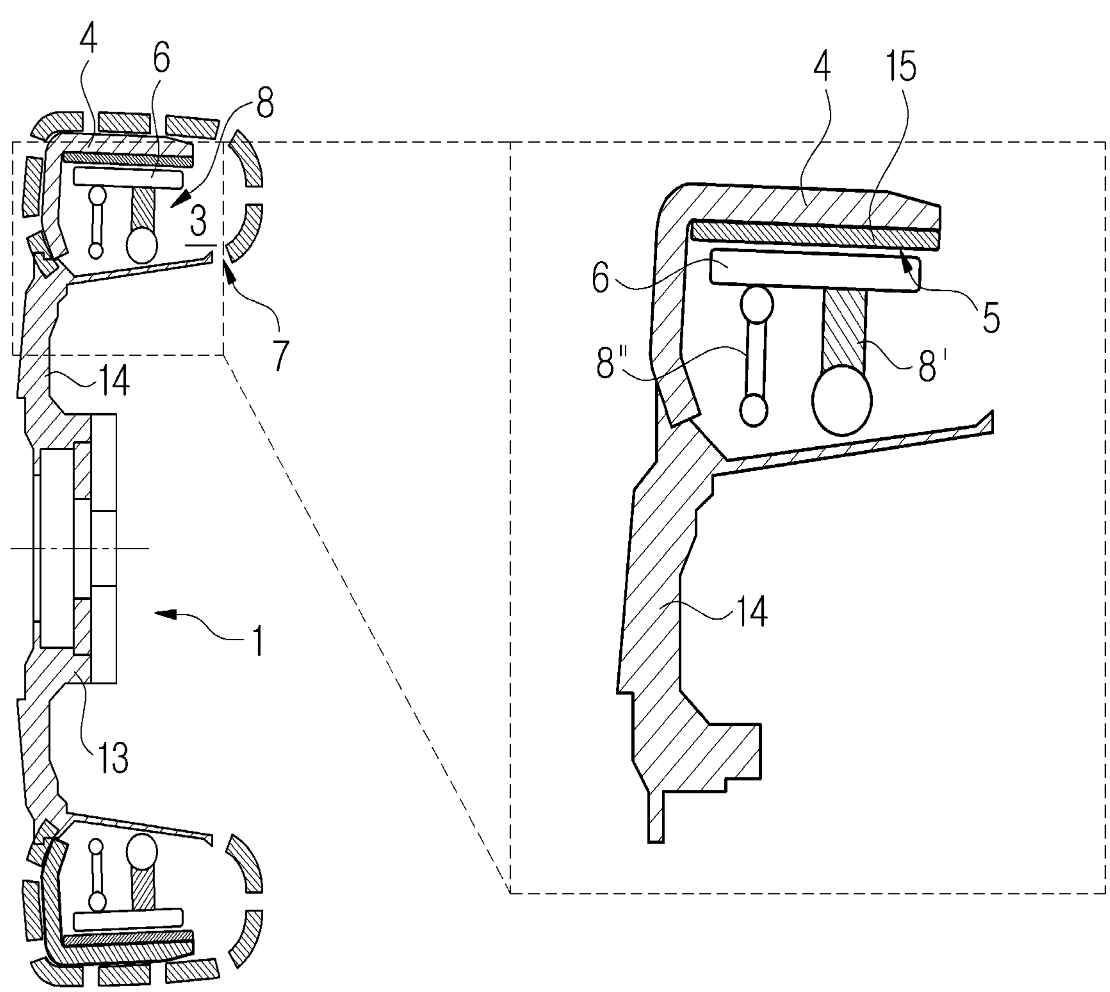

FIG. 18 shows a further embodiment of the brake system, in the same views as in the case of FIGS. 11-17. It is also a radially outward-braking brake system, as in the case of FIGS. 15-17. It differs from the embodiment of FIG. 17 in that the additional material layer 15 is made of a friction material, like the friction materials used in brake pads, such as a semi-metallic friction material, or a low-metallic friction material, or an organic friction material, or a ceramic friction material.

Figure 19:
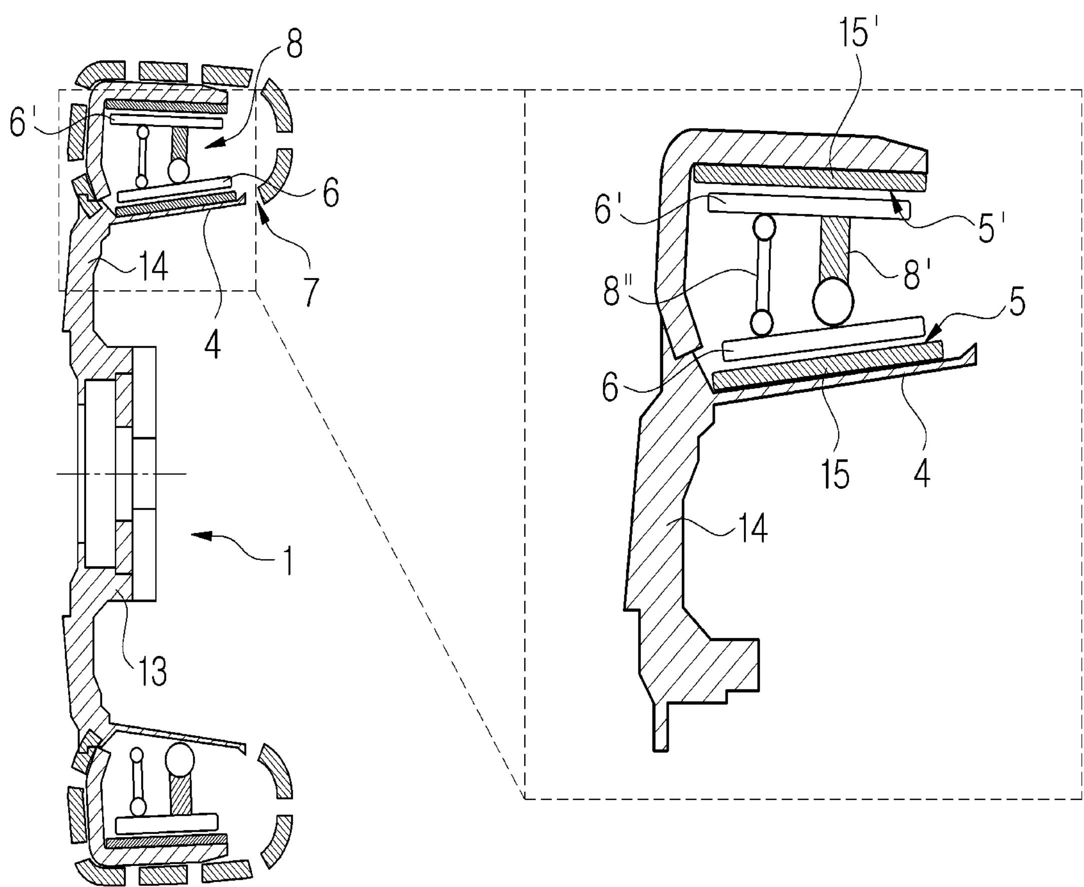

FIG. 19 shows a further embodiment of the brake system, in the same views as in the case of FIGS. 11-18. the brake system features two opposed friction surfaces. A friction surface 5 is provided at a radially inner portion of the wall 4 delimiting the chamber 3, and a further friction surface 5' is provided in addition to the friction surface 5, at a radially outer portion of the wall 4 delimiting the chamber 3. The two friction surfaces 5, 5' are thus provided at opposing wall portions of the chamber, and there are a brake shoe 6 for moving radially inward for engaging with the friction surface 5 and a further brake shoe 6' for moving radially outward for engaging with the further friction surface 5. The brake system is thus radially inward-braking and radially outward-braking at the same time. As can be seen at the left hand side of FIG. 19, a second pair of opposed brake shoes is provided at the bottom, at a circumferentially opposed position to the brake shoe 6 and the further brake shoe 6'.

By way of example only, the friction surface 5 and the further friction surface 5' are shown as being provided by a material layer 15 and an additional material layer 15', respectively. It is understood that the concept of a brake system with two opposed friction surfaces as shown in FIG. 19 may also be implemented with friction surfaces 5, 5' that are provided directly by wall surfaces of the wall 4 delimiting the chamber 3, said wall surfaces being for instance made of cast iron.

Alternatively, two opposed friction surfaces may be provided at an axial outer side and an axial inner side, for example.

Figure 20:
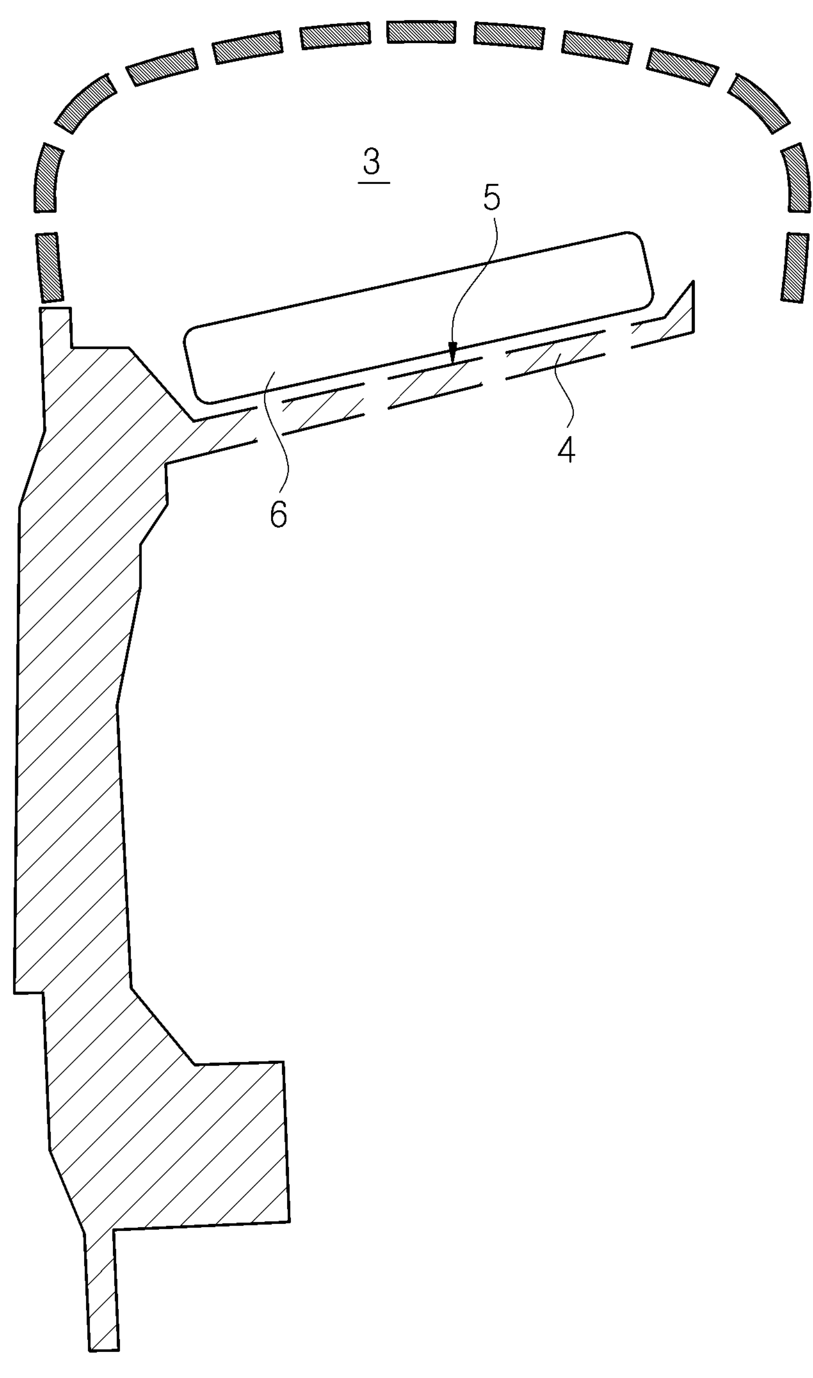
FIGS. 20-21 show brake systems with cooling holes.
Figure 21:
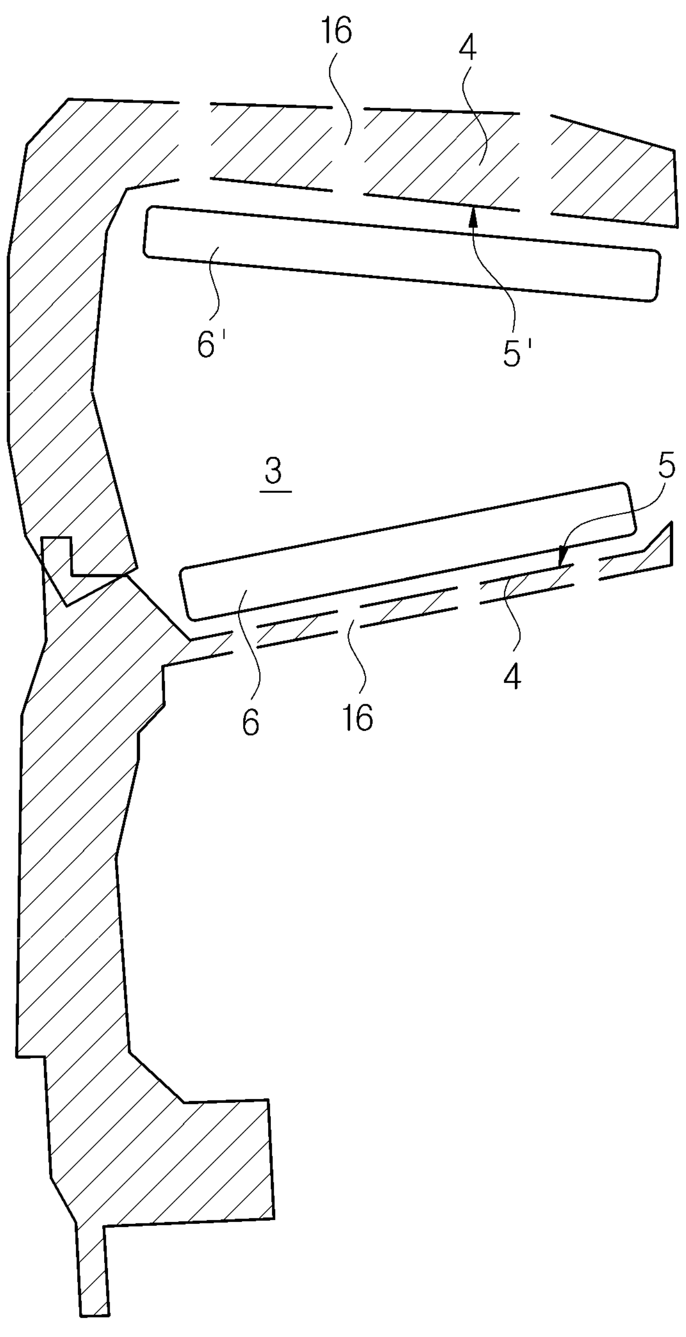

FIGS. 20-21 show a design option for dissipating heat generated within the brake system. Therein, the wall 4 delimiting the chamber 3 comprises cooling holes 16 which are provided in a region of the friction surface 5. I.e., the section(s) of the wall 4 where the brake pad 6 or brake pads 6, 6' engage with the respective wall surface of the wall comprises a plurality of through-openings forming the cooling holes 16. FIG. 20 illustrates this in an exemplary fashion for a single radially inward-braking brake pad 6, and FIG. 21 illustrates this for a design having two opposed friction surfaces 5, 5'.

Figure 22:
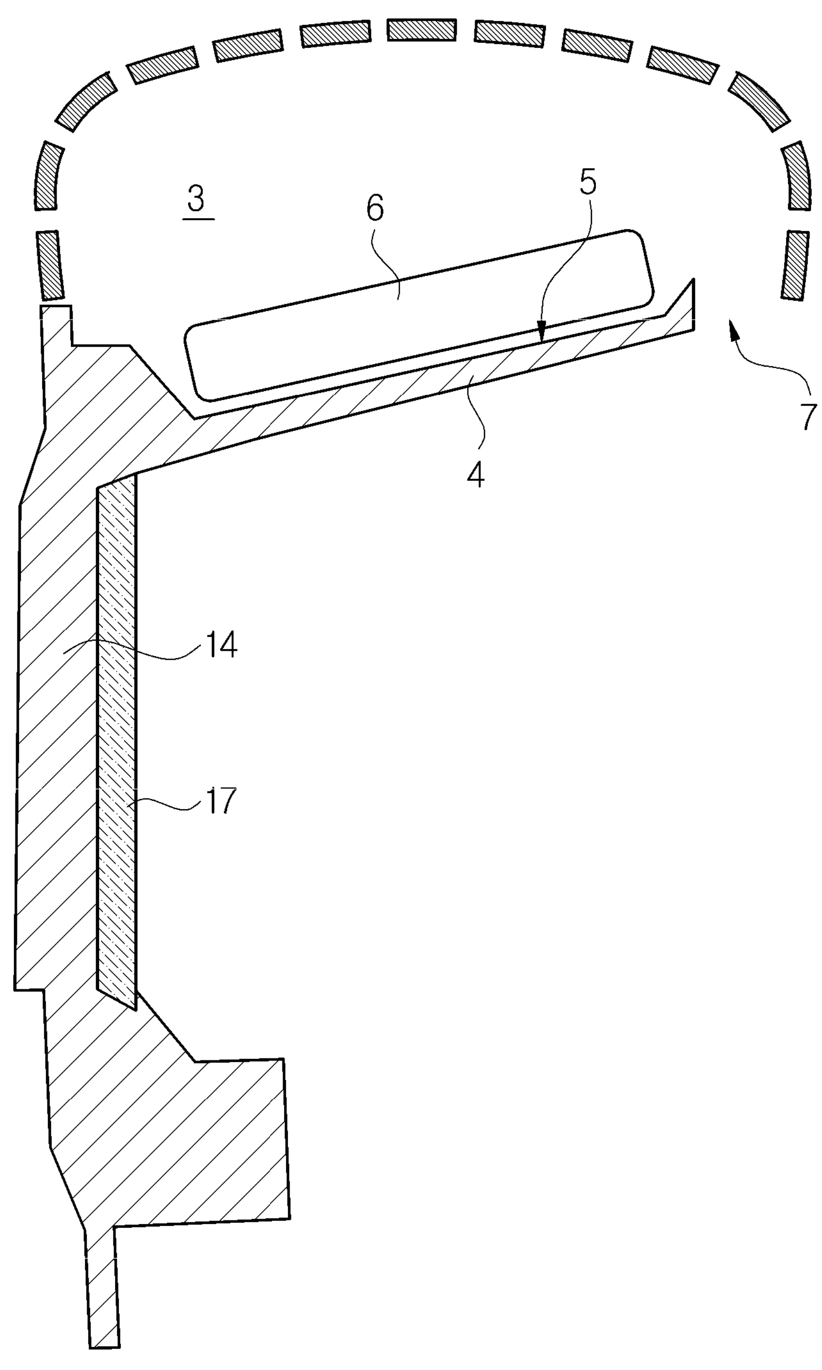
FIGS. 22-23 show brake systems with dust filters.
Figure 23:
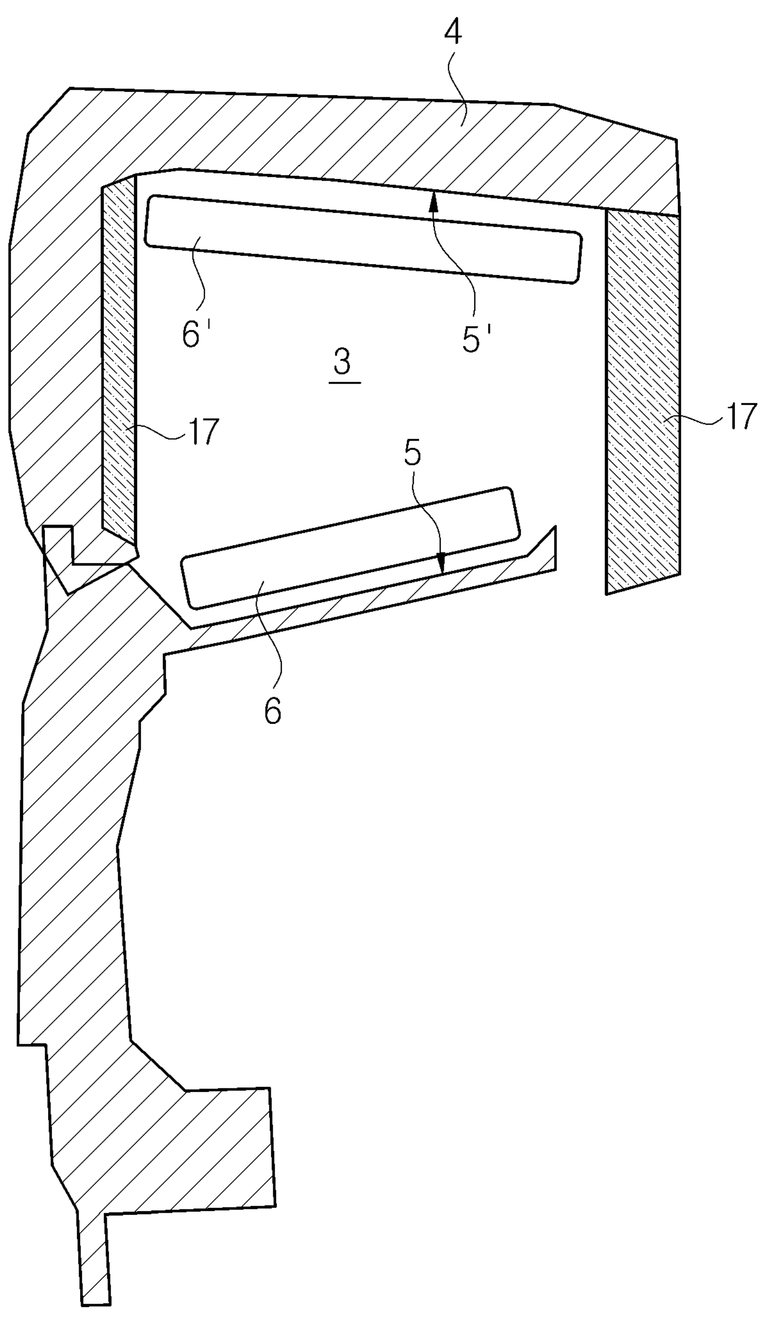

FIGS. 22 and 23 show brake systems according to the application with dust collectors 17. In the case of FIG. 22, a dust collector 17 is provided, which is attached to spokes 14 of the wheel 1 and thus provided radially inward of the chamber 3. Dust is generated during braking, when the brake pad 6 is pressed against the friction surface 5. This dust can exit through the opening 7 and may at least in part be caught by the dust collector 17 to prevent the dust from entering the environment. The dust collector comprises a magnetic material for adhesion of metallic brake dust. In the case of FIG. 23, two dust collectors 17 are provided within the chamber 3, at the axially inner side and the axially outer side thereof. They prevent dust from exiting the chamber 3. The dust collectors may also comprise a magnetic material for adhesion of metallic brake dust, and/or an adhesive layer.

Figure 24:
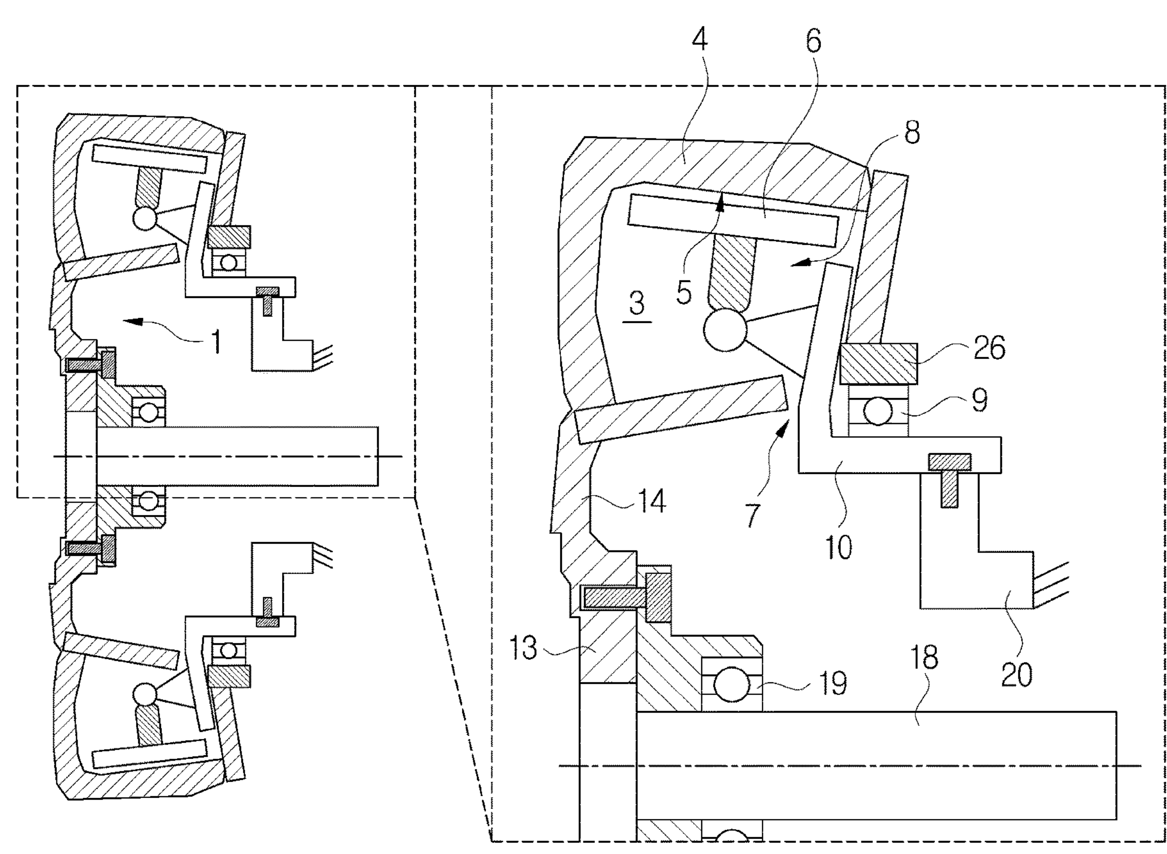
FIG. 24 illustrates a connection of a brake system to an axle and a knuckle.

By way of FIG. 24, bearing of the wheel 1 is explained. On the left hand side, an overview of the wheel is shown, and on the right hand side, an enlarged view of a top portion of the arrangement is displayed. Therein, the wheel rotates via two sets of bearings: A main bearing 19 is for bearing the wheel hub 13 on the axle 18, which corresponds to many standard hub bearings. Furthermore, an auxiliary bearing 9 is for bearing a rim portion of the wheel 1 on a knuckle 20, via a carrier 10. The actuator system 8, which passes through the opening 7 is also attached to the carrier 10.

Figure 25:
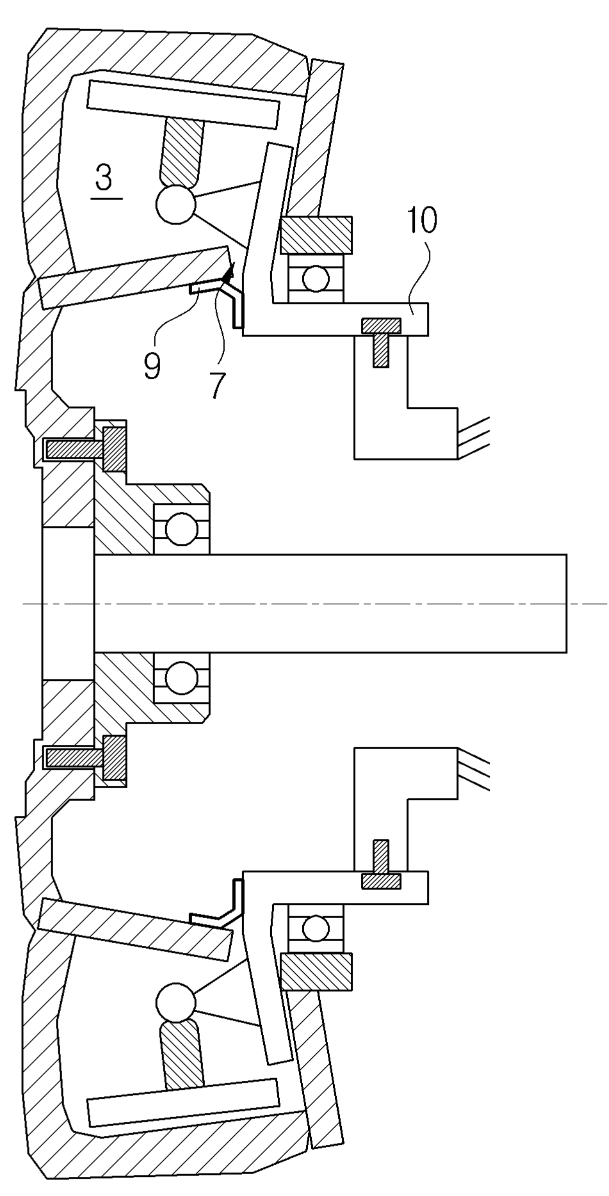
FIGS. 25-27 show functions of a seal of a brake system.
Figure 26:
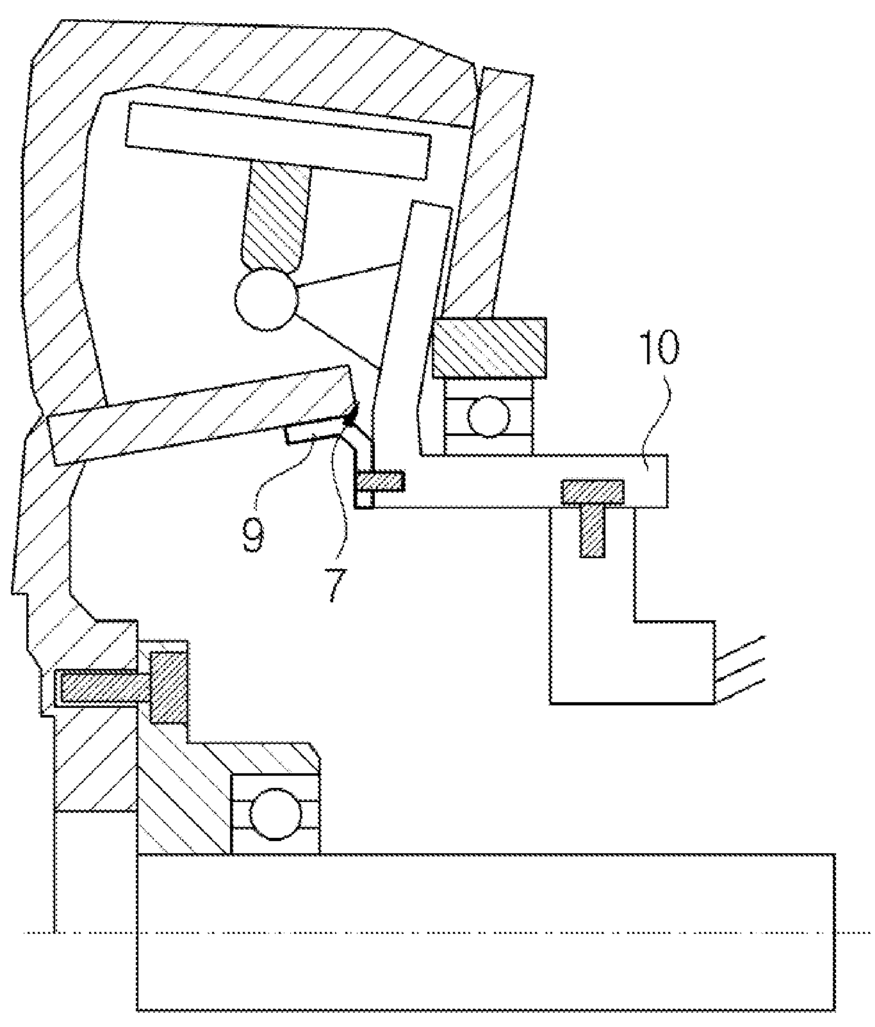
Figure 27:
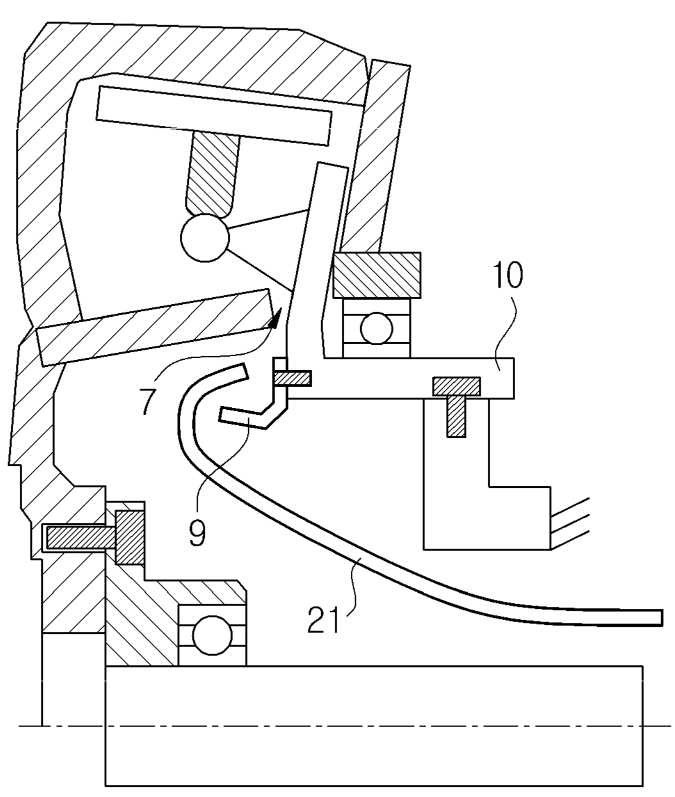

FIGS. 25-27 show a design option which may improve protecting the environment from brake dust. The chamber 3 comprises the opening 7 extending around the entire circumference of the wheel 1, for passing the actuator system 8 through the opening 7, the opening 7 being provided in a radially inner wall portion of the chamber 3. A sliding seal 9 is provided for closing the opening 7.

FIG. 26 shows a status while driving. The sliding seal 7 is attached to the carrier 10 and slides on the outer side of the radially inner wall of the chamber 3, inhibiting dust from leaving the chamber 3.

FIG. 27 shows a status during a maintenance and cleaning process. The seal 7 is lifted to allow passing a pipe or hose of a vacuum cleaning system 21 through the seal and into the chamber, so that brake dust can be sucked out of the chamber 3.

Figure 28:
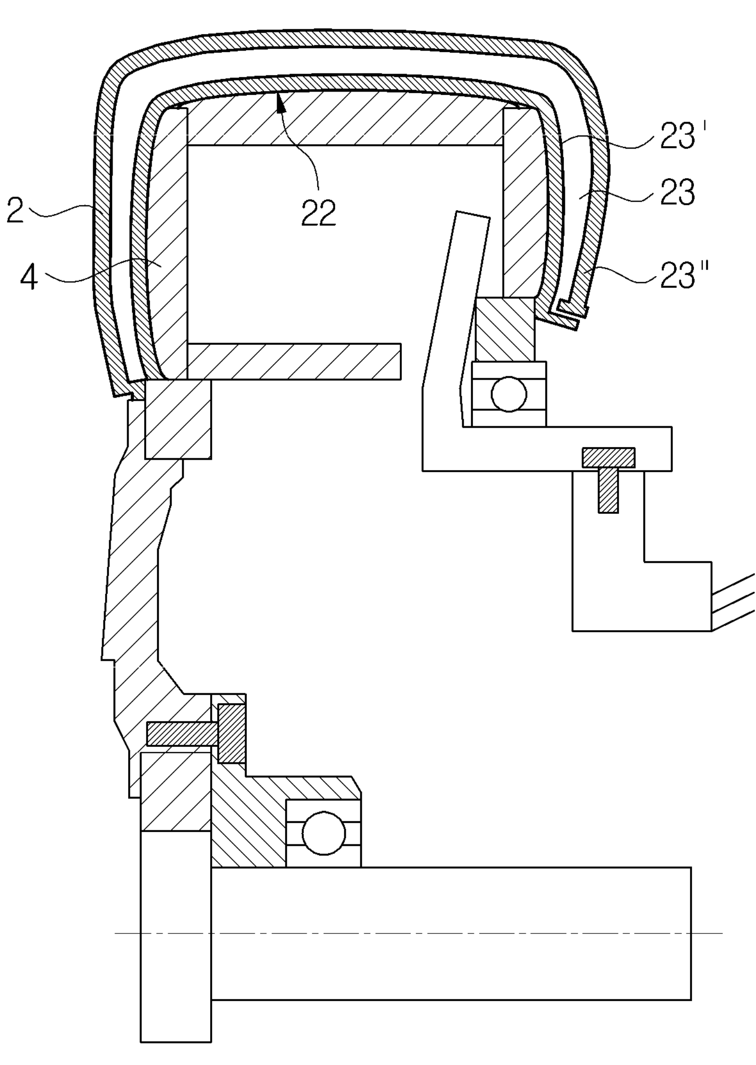
FIG. 28 shows a tire design for a brake system according to the invention.

FIG. 28 illustrates a possible tire design which may be envisioned in conjunction with the above-described brake system, which has the chamber 3 arranged within the volume defined by the tire 2. The tire 2 is connected to the wheel 1 by an adhesive 22. The adhesive 22 is provided between an inner surface of the tire, and a portion of an outer surface of the wall 4 delimiting the chamber 3. The tire comprises a tire cavity 23 that is filled with air. The tire cavity 23 is between an inner rubber layer 23', which faces the wall 4 of the chamber 4, and an outer rubber layer 23" for contacting a street surface.

What is claimed is:

1. A brake system for a vehicle, comprising a wheel and a tire mounted on the wheel, wherein the wheel has a chamber that is at least partially arranged within a volume defined by the tire, a friction surface being provided at a wall delimiting the chamber, a brake shoe being arranged within the chamber, configured to be pressed against the friction surface for braking, wherein the brake system comprises a main bearing for bearing a wheel hub on an axle and an auxiliary bearing for bearing a rim portion of the wheel on a knuckle or on a carrier for connection with the knuckle.

2. The brake system according to claim 1, wherein the chamber comprises an opening extending around an entire circumference of the wheel, for passing an actuator system through the opening, the opening radially inward from the chamber.

3. The brake system according to claim 2, wherein a sliding seal is provided for at least partially closing the opening.

4. The brake system according to claim 1, wherein the friction surface is provided at a radially inner wall portion or a radially outer wall portion or an axially inner wall portion or an axially outer wall portion of the wall of the chamber.

5. The brake system according to claim 1, wherein a further friction surface is provided at a further wall portion of the wall delimiting the chamber opposite to the friction surface.

6. The brake system according to claim 1, wherein the wheel has one or more cavities that are at least partially arranged within the volume defined by the tire, the one or more cavities being located adjacent to a section of the wall at which the friction surface is provided, opposite of the friction surface.

7. The brake system according to claim 1, wherein a stiffening element is provided on the wheel, the stiffening element connecting a hub or a spoke of the wheel, with a radially inner wall portion of the chamber.

8. The brake system according to claim 1, wherein the friction surface is formed by a wall surface of the wall delimiting the chamber.

9. The brake system according to claim 1, wherein the friction surface is formed by a material layer which is attached to the wall delimiting the chamber, wherein the material layer is made of metal including cast iron, or of a friction material including a semi-metallic friction material, or a low-metallic friction material, or an organic friction material, or a ceramic friction material.

10. The brake system according to claim 1, wherein the wall delimiting the chamber is made of cast iron and/or spokes of the wheel are made of cast iron or aluminium.

11. The brake system according to claim 1, wherein the wall delimiting the chamber comprises cooling holes, the cooling holes being provided in a region of the friction surface.

12. The brake system according to claim 1, wherein a dust collector is provided, the dust collector being provided within the chamber and/or in a spoke region of the wheel, the dust collector comprising a magnetic material for adhesion of metallic brake dust.

13. The brake system according to claim 1, wherein the brake shoe is configured to be pressed radially inwardly against the friction surface for braking.

14. The brake system according to claim 1, wherein the tire is connected to the wheel by an adhesive, the adhesive being provided between an inner surface of the tire, and at least a portion of an outer surface of the wall delimiting the chamber.

15. The brake system according to claim 1, wherein the tire comprises a tire cavity.

* * * * *